March 22, 1960     O. ALVISTUR     2,929,641

BICYCLE WITH SWINGABLE DRIVE SPROCKET

Filed May 7, 1956

INVENTOR.
Oscar Alvistur

BY *A. Schapp*

ATTORNEY

United States Patent Office 2,929,641
Patented Mar. 22, 1960

2,929,641

BICYCLE WITH SWINGABLE DRIVE SPROCKET

Oscar Alvistur, San Francisco, Calif.

Application May 7, 1956, Serial No. 583,325

5 Claims. (Cl. 280—261)

The present invention relates to improvements in a two-way bicycle, and its principal object is to provide a bicycle which may be operated by the occupant in two different positions, one position being the conventional seated position, and the other position being with the occupant lying prone and horizontally on the seat, with his hand extending forwardly to grasp the steering handles and with his feet extending rearwardly for operating the sprocket drive.

In carrying out the idea of my invention, it is proposed to provide a sprocket drive which is swingable about the axis of the drive wheel between two different positions, with the drive sprocket disposed under the seat in one position for conventional driving, and disposed rearwardly of the wheel in the other position for driving by an operator lying prone on the seat, with his hands grasping the steering means for the front wheel.

It is further proposed to provide means for securing the drive sprocket in either one of the driving positions, it being understood, of course, that the adjusting feature may be omitted, with the drive sprocket mounted permanently behind the rear wheel for operation with the body in prone position for reducing and body-building exercises.

Further objects and advantages of my Two-Way Bicycle will be apparent as the specification proceeds, and the new and useful features of the invention will be fully defined in the claims attached hereto.

Figure 1:
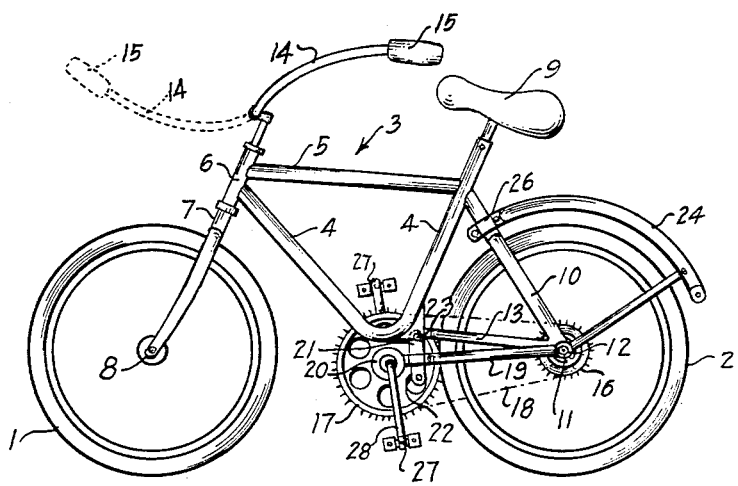
Figure 2:
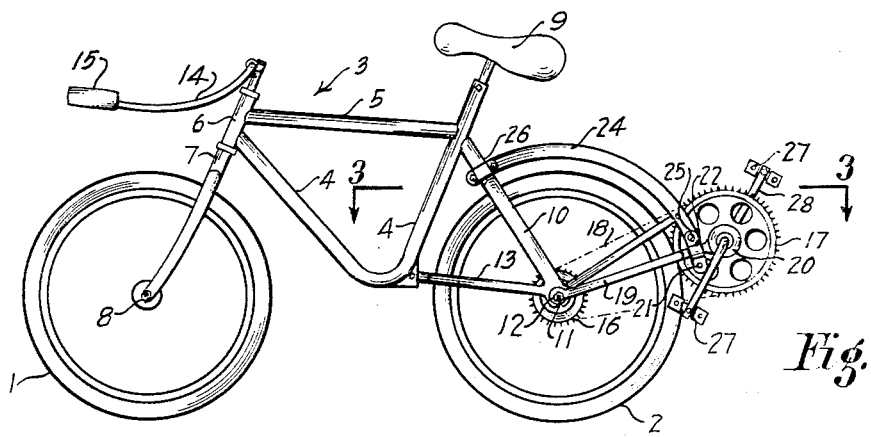
Figure 3:
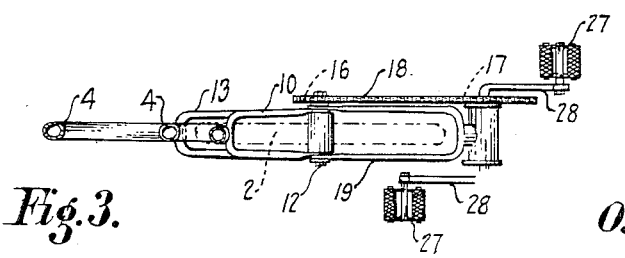

The preferred form of my invention is illustrated in the accompanying drawing, forming part of this specification, in which:

Figure 1 shows a side view of my bicycle, with the parts arranged in conventional form for operation by a person seated on the seat;

Figure 2, a side view of the bicycle with the parts arranged for a person lying on the seat in prone and substantially horizontal position; and Figure 3, a section taken along line 3—3 of Figure 2.

While I have shown only the preferred form of my invention, it should be understood that various changes or modifications may be made within the scope of the claims hereto attached, without departing from the spirit of the invention.

Referring to the drawing in detail, my bicycle, except for the parts forming the specific features of my invention, may be of conventional form, comprising a front steering wheel, a rear drive wheel 2, and a frame supported by the wheels.

The frame comprises, in its principal features, a V-shaped frame member 4, a horizontal bar 5 secured upon the rear leg of the V-shaped member and cooperating with the front leg in supporting an inclined pipe section 6, which in turn supports the steering posts 7 having a lower end straddling the steering wheel and pivoted thereto, as at 8. The rear leg of the V-shaped member supports the seat 9.

A forked brace 10 extends rearwardly from the upper end of the rear leg of the V-shaped member 4 on a downward incline and furnishes a bearing 11 for the axle 12 of the drive wheel, the brace in turn being fortified by a second brace 13 connecting the lower ends of the brace 10 and the crotch of the V-shaped member 4.

The upper end of the steering post is provided with a transverse steering rod 14 terminating in the handles 15, the steering rod being curved in a suitable manner to bring the handles within convenient reach for the operator, and being adjustable to various positions, as shown by the full and dotted lines in Figure 1, to suit the convenience of the operator.

The drive selected for the purpose of the present invention is the conventional sprocket drive including a small sprocket 16 fixed with respect to the drive wheel 2 and mounted co-axially therewith, a larger drive sprocket 17 spaced from the small sprocket and mounted in the vertical plane thereof, and a chain 18 trained over the two sprockets.

In conventional construction, the large sprocket takes bearing in a fixed frame member at or near the crotch of the V-shaped member 4, but in the present invention, the sprocket is revolvably mounted in the free end of a swingable yoke 19 pivoted upon the axle of the rear wheel, and swingable about said axle from a substantially horizontal forward position shown in Figure 1 to an upwardly inclined rearward position, shown in Figure 2.

For carrying out this swinging movement, the operator will lift the rear wheel so that the sprocket swings around the bottom of the rear wheel in concentric relation thereto.

The yoke 19 straddles the rear wheel and terminates, at its free end, in a bearing 20 for the sprocket.

The swinging yoke may be secured in either position, by any suitable means. The means shown here comprises a pair of straps 21 and 22 extending vertically from the yoke in opposite directions, the strap 21 being secured upon the frame at or near the crotch of the V-shaped member, as at 23, in the forward position of the yoke, and the strap 22 being secured upon the rear end of the fender 24, as at 25.

The front end of the fender is secured upon the brace 10, as at 26, and the fender, naturally will be of sturdier construction than the conventional fender to serve as a suitable support for the sprocket.

The sprocket is provided with the conventional foot pedals 27, and cranks 28.

In operation, with the parts arranged as in Figure 1, the bicycle may be operated in the conventional manner, with the occupant seated on the seat 9, grasping the handles 15 and operating the foot pedals with his legs in downward position.

For changing the bicycle, the operator merely disconnects the strap 21 at 23, swings the yoke on the axis of the rear wheel, with the major sprocket wheel travelling about the circumference of the wheel, and secures the yoke in the upwardly and rearwardly inclined position of Figure 2 by fastening the strap 22 upon the rear end of the fender 24.

At the same time, the operator will probably adjust the steering handles to a more forward position.

Next, the operator places himself, face downward, upon the bicycle, in horizontal position, with his abdominal region lying on the seat, his hands grasping the handles 15 and his feet on the foot pedals.

The operator may now drive the bicycle forward by operation of the foot pedals to provide exercise intended principally for reducing and strengthening of the muscles of the abdominal region, but also intended for pleasure, health and the development of skill.

I claim:

1. In a two-way bicycle, a frame, a pair of wheels supporting the same, a seat supported by the frame, and a chain and sprocket drive for one of the wheels, the drive being revolvable about the axis of said wheel and having means for locking the same either forwardly of the wheel or rearwardly thereof.

2. In a two-way bicycle, a frame, a pair of wheels supporting the same, a seat supported by the frame, and a drive for one of the wheels comprising a sprocket mounted co-axially with the wheel, a second sprocket mounted in spaced relation to the first sprocket, a chain guided over the sprockets, and means for securing the second sprocket upon the frame in different positions, including a position forwardly of the wheel and a position rearwardly of the wheel.

3. In a two-way bicycle, a frame, a pair of wheels supporting the same, a seat supported by the frame, a sprocket on one of the wheels, a yoke member pivoted coaxially with said wheel, a second sprocket rotatably mounted in said yoke outside the wheel and in alined relation to the first sprocket, a chain trained over the sprockets, foot pedals on the second sprocket, and means for securing the free end of the yoke to the frame in different positions, including one position forwardly of the wheel and one position rearwardly of the wheel.

4. In a bicycle of the character described, a frame, a pair of wheels supporting the same including a front steering wheel and a rear driving wheel, a seat supported on the frame, a steering handle for the steering wheel mounted forwardly of the seat, and a drive for the rear wheel including a pedal-operated sprocket mounted rearwardly of the wheel, whereby a person lying prone on the seat may grasp the handle for steering and operate the sprocket with his feet, the sprocket being swingable about the axis of the rear wheel and around the bottom of the wheel to a position below the seat for operation by a person seated on the seat.

5. In a two-way bicycle, a frame, a pair of wheels supporting the same, a seat supported by the frame, a sprocket on one of the wheels, a yoke member pivoted co-axially with said wheel, a second sprocket rotatably mounted in the free end of the yoke outside the wheel and in alined relation to the first sprocket, a chain trained over the sprockets, and foot pedals on the second sprocket, the free end of the yoke member being operable for swinging movement about the bottom of the wheel to position the sprocket carried thereby forwardly or rearwardly of the wheel, and the free end of the yoke member having means for locking the same in a forward position as well as in a rearward position.

References Cited in the file of this patent

UNITED STATES PATENTS

| | | |
|---|---|---|
| 387,979 | Latta | Aug. 14, 1888 |
| 2,602,677 | Connolly | July 8, 1952 |

FOREIGN PATENTS

| | | |
|---|---|---|
| 236,146 | Switzerland | May 16, 1945 |